US010058105B2

(12) United States Patent
French (10) Patent No.: US 10,058,105 B2
(45) Date of Patent: Aug. 28, 2018

(54) SMOKING DEVICE

(71) Applicant: Lynx Grills, Inc., Downey, CA (US)

(72) Inventor: John Timothy French, Anaheim Hills, CA (US)

(73) Assignee: Lynx Grills, Inc., Downey, CA (US)

( * ) Notice: Subject to any disclaimer, the term of this patent is extended or adjusted under 35 U.S.C. 154(b) by 53 days.

(21) Appl. No.: 15/054,057

(22) Filed: Feb. 25, 2016

(65) Prior Publication Data

US 2017/0245511 A1    Aug. 31, 2017

(51) Int. Cl.
*A23B 4/044* (2006.01)
*A23B 4/052* (2006.01)
*A23L 5/10* (2016.01)

(52) U.S. Cl.
CPC ............... *A23B 4/052* (2013.01); *A23L 5/17* (2016.08); *A23V 2002/00* (2013.01)

(58) Field of Classification Search
CPC ....... A23B 4/044; A23B 4/052; A23B 4/0523; A23B 4/0526; A23B 4/056; A23L 5/17; A23V 2002/00
USPC .......................... 99/482, 340, 481; 126/25 R
See application file for complete search history.

(56) References Cited

U.S. PATENT DOCUMENTS

| 4,454,805 | A | 6/1984 | Matthews | |
|---|---|---|---|---|
| 5,553,601 | A * | 9/1996 | Parker | A47J 37/0713 126/38 |
| 8,833,360 | B2 | 9/2014 | Knight | |
| 2007/0107607 | A1 * | 5/2007 | Gonzalez | A23B 4/044 99/482 |
| 2008/0163765 | A1 * | 7/2008 | O'Shea | A47J 37/0713 99/482 |
| 2010/0089248 | A1 | 4/2010 | Jones | |
| 2013/0192476 | A1 * | 8/2013 | Broerman | A23B 4/044 99/482 |
| 2015/0136112 | A1 * | 5/2015 | Dyson | A47J 37/0704 126/25 R |

FOREIGN PATENT DOCUMENTS

| JP | 2002-122328 | 4/2002 |
|---|---|---|
| KR | 10-2010-0051489 | 5/2010 |

OTHER PUBLICATIONS

International Search Report for PCT/US2017/019089, dated May 25, 2017, 3 pp.
Written Opinion for PCT/US2017/019089, dated May 25, 2017, 6 pp.

* cited by examiner

*Primary Examiner* — Hung D Nguyen
(74) *Attorney, Agent, or Firm* — Brinks Gilson & Lione (57) ABSTRACT

A smoking device can include one or more walls defining, at least in part, a combustion cavity, a lower inlet connecting the combustion cavity to an air source, a first flange defining, at least in part, a first recirculation channel open to an upper side of the combustion cavity, a second flange defining, at least in part, a second recirculation channel open to the upper side of the combustion cavity, and an upper inlet connecting the upper side of the combustion cavity to the air source and disposed between the first recirculation channel and the second recirculation channel. While a flame is generated within the combustion cavity, a convection flow from the flame can be directed to the first recirculation channel and the second recirculation channel and past the upper inlet to reduce the upper flow of air from the upper inlet until the flame is reduced.

16 Claims, 6 Drawing Sheets

SMOKING DEVICE

FIELD

The subject technology relates to cooking devices.

BACKGROUND

Smoking food has long been an established method for adding flavor to food, as well as for preservation of food. A smoking process involves exposing food to low temperatures for long periods of time to obtain the desired results. The food is placed in a contained space while smoke from wood or other fuel is created to flow over the food. The length of time, type and amount of wood smoke, and temperature are monitored to achieve the desired results.

SUMMARY

A smoking process can involve combustion of wood or another fuel with enough air to maintain a smoking burn, but not so much as to allow the wood to ignite with a flame. With a flame, too much heat and too little smoke are produced. Thus, combustion without a flame will allow food to be cooked at a lower temperature, for a longer duration of time, and with more even heat distribution. According to some aspects of the present disclosure, a smoking device and the use thereof can allow regulation of the intake of air (e.g., oxygen) such that air intake is reduced when a flame forms until the flame is extinguished.

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause. e.g., Clause 1, Clause 17, or Clause 19. The other clauses can be presented in a similar manner.

Clause 1. A smoking device, comprising:
one or more walls defining, at least in part, a combustion cavity;
a lower inlet connecting the combustion cavity to an air source;
a first flange defining, at least in part, a first recirculation channel open to an upper side of the combustion cavity;
a second flange defining, at least in part, a second recirculation channel open to the upper side of the combustion cavity;
an upper inlet connecting the upper side of the combustion cavity to the air source and disposed between the first recirculation channel and the second recirculation channel.

Clause 2. The smoking device of clause 1, wherein the combustion cavity has a maximum combustion cavity width that is substantially equal to a sum of a maximum first recirculation channel width of the first recirculation channel, a maximum second recirculation channel width of the second recirculation channel, and a maximum upper inlet width of the upper inlet.

Clause 3. The smoking device of clause 2, wherein the maximum upper inlet width is 20-50% of the maximum combustion cavity width.

Clause 4. The smoking device of clause 2, wherein the maximum first recirculation channel width is equal to the maximum second recirculation channel width.

Clause 5. The smoking device of clause 2, wherein a maximum lower inlet width is 10-20% of the maximum combustion cavity width.

Clause 6. The smoking device of clause 1, wherein a maximum combustion cavity height of the combustion cavity is 1-3 times a maximum first recirculation channel height of the first recirculation channel.

Clause 7. The smoking device of clause 1, wherein a maximum combustion cavity height of the combustion cavity is 1-3 times a maximum recirculation channel height of each of the first recirculation channel and the second recirculation channel.

Clause 8. The smoking device of clause 1, wherein the upper inlet and the lower inlet are on opposite sides of the combustion cavity.

Clause 9. The smoking device of clause 1, wherein the first recirculation channel and the upper inlet are separated by the first flange.

Clause 10. The smoking device of clause 1, wherein the second recirculation channel and the upper inlet are separated by the second flange.

Clause 11. The smoking device of clause 1, wherein each of the one or more walls, the first flange, and the second flange extends from a first longitudinal end of the smoking device to a second longitudinal end of the smoking device.

Clause 12. The smoking device of clause 1, wherein each of the combustion cavity, the first recirculation channel, and the second recirculation channel, and the upper inlet extends from a first longitudinal end of the smoking device to a second longitudinal end of the smoking device.

Clause 13. The smoking device of clause 1, further comprising a first end cap at a first longitudinal end of the smoking device and a second end cap at a second longitudinal end of the smoking device.

Clause 14. The smoking device of clause 1, further comprising one or more partitions between a first longitudinal end of the smoking device and a second longitudinal end of the smoking device, the one or more partitions partially separating the combustion cavity into two or more zones.

Clause 15. The smoking device of clause 14, wherein each of the one or more partitions provides a longitudinal opening through the corresponding partition and adjacent to the lower inlet.

Clause 16. The smoking device of clause 14, further comprising an ignition port at a longitudinal endmost one of the zones.

Clause 17. A method, comprising:
combusting a fuel within a combustion cavity of a smoking device while receiving a lower flow of air from a lower inlet and an upper flow of air from an upper inlet;
while a flame is generated within the combustion cavity, directing a convection flow from the flame along walls and within the combustion cavity to (i) a first recirculation channel open to an upper side of the combustion cavity and (i) a second recirculation channel open to the upper side of the combustion cavity;
directing the convection flow (i) along a first flange and within the first recirculation channel and (ii) along a second flange and within the second recirculation channel past the upper inlet, disposed between the first recirculation channel and the second recirculation channel, to reduce the upper flow of air from the upper inlet until the flame is reduced.

Clause 18. The method of clause 17, wherein combusting the fuel within the combustion cavity comprises:
combusting a first portion of the fuel within a first zone of the combustion cavity;

transmitting heat through a longitudinal opening of a partition and to a second zone of the combustion cavity;

combusting a second portion of the fuel within the second zone of the combustion cavity.

Clause 19. A method of assembling a smoking device, comprising:

attaching a first end cap to first longitudinal ends of a first plate and a second plate;

attaching a second end cap to second longitudinal ends of the first plate and the second plate;

wherein the first plate comprises a first wall and a first flange;

wherein the second plate comprises a second wall and a second flange;

wherein the first wall and the second wall define, at least in part, a combustion cavity and a lower inlet connecting the combustion cavity to an air source;

wherein the first flange defines, at least in part, a first recirculation channel open to an upper side of the combustion cavity;

wherein the second flange defines, at least in part, a second recirculation channel open to the upper side of the combustion cavity;

wherein the first flange and the second flange define, at least in part, an upper inlet connecting the upper side of the combustion cavity to the air source and disposed between the first recirculation channel and the second recirculation channel.

Clause 20. The method of clause 19, further comprising positioning one or more partitions between the first longitudinal end of the smoking device and the second longitudinal end of the smoking device, the one or more partitions partially separating the combustion cavity into two or more zones.

Clause 21. The method of clause 20, wherein each of the one or more partitions provides a longitudinal opening through the corresponding partition and adjacent to the lower inlet.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplifying and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

DETAILED DESCRIPTION

In the following detailed description, specific details are set forth to provide an understanding of the subject technology. It will be apparent, however, to one ordinarily skilled in the art that the subject technology may be practiced without some of these specific details. In other instances, well-known structures and techniques have not been shown in detail so as not to obscure the subject technology.

An important aspect of a smoking process is the propagation of smoke from wood or other fuel. The combustion process should be maintained with enough air to maintain a smoking burn, but not so much as to allow the fuel to ignite to flame. With a flame, too much heat and too little smoke is produced. According to some aspects of the present disclosure, production of a flame is reduced and regulated to extend the time required to combust a given amount of fuel. According to some aspects of the present disclosure, production of smoke without flame provides a uniform rate of heat release over an extended period of time.

Figure 1A:
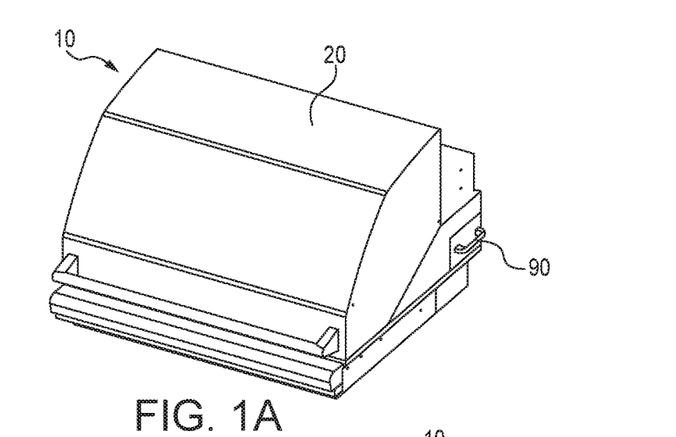
FIG. 1A shows a perspective view of a smoking device within a cooking device in a closed state, according to some embodiments of the present disclosure.
Figure 1B:
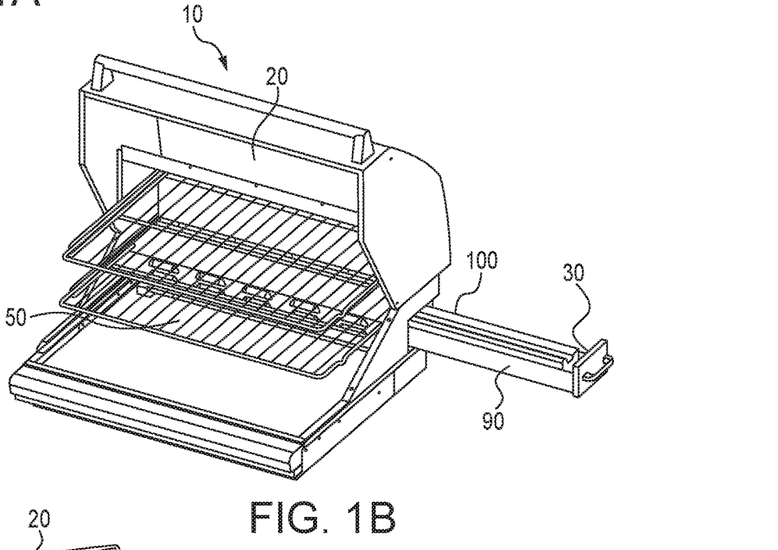
FIG. 1B shows a perspective view of the smoking device and the cooking device, in an open state, of FIG. 1A, according to some embodiments of the present disclosure.
Figure 1C:
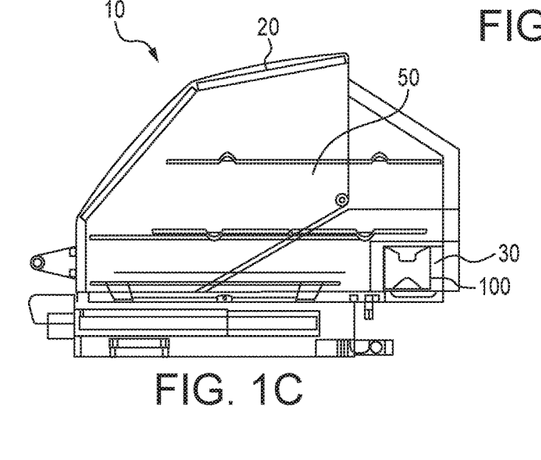
FIG. 1C shows a partial sectional view of the smoking device and the cooking device, in the closed state, of FIG. 1A, according to some embodiments of the present disclosure.

According to some embodiments, for example as shown in FIGS. 1A-1C, a cooking device 10 can be used to generate and/or contain heat for transmission to food or other contents of the cooking device 10. The cooking device 10 can include a lid 20 that, when open, provides access to a smoking chamber 50 of the cooking device 10. When closed, the lid 20 can at least partially define the enclosed smoking chamber 50. The cooking device 10 can include a drawer 90 that is slidably moveable from a closed position within the smoking chamber 50, for example as shown in FIG. 1A, to an open position outside the smoking chamber 50, for example as shown in FIG. 1B. The drawer 90 can include a receptacle 30 for receiving and supporting a smoking device 100 therein while the drawer 90 is in the open position. After receiving the smoking device 100 within the receptacle 30, the drawer 90 can be moved to the closed position within the smoking chamber 50. The smoking device 100, when positioned within the receptacle 30, can generate heat that is transmitted to the food or other contents within the smoking chamber 50. Heat can be transmitted from the smoking device 100 to and throughout the smoking chamber 50 by convection and/or diffusion of smoke generated by the smoking device 100.

Figure 2:
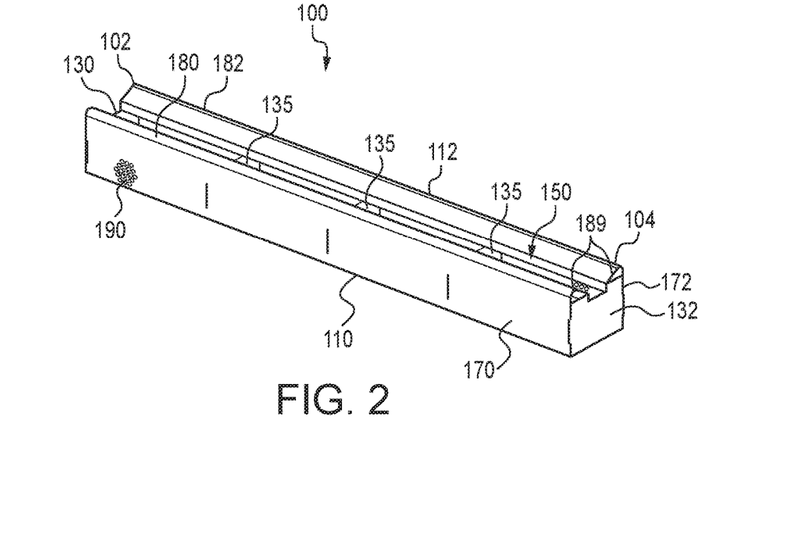
FIG. 2 shows a perspective view of a smoking device, according to some embodiments of the present disclosure.

According to some embodiments, for example as shown in FIG. 2, a smoking device 100 includes one or more plates 110, 112 that extend longitudinally to define one or more cavities, channels, or chambers therein. The smoking device 100 can include a first plate 110 having a first wall 170 and a first flange 180. The smoking device 100 can also include a second plate 112 having a second wall 172 and a second flange 182. The smoking device 100 can include a first end cap 130 at a first longitudinal end 102 of the smoking device 100 and a second end cap 132 at a second longitudinal end 104 of the smoking device 100. The first end 130 and the second end 132 can join together the first plate 110 and the second plate 112 and define boundaries of one or more cavities, channels, chambers, and/or zones formed between the first plate 110 and the second plate 112, as discussed further herein. According to some embodiments, the smoking device 100 can include additional plates that can be combined in an assembly to form the first wall 170, the first flange 180, the second wall 172, and the second flange 182. Alternatively, a single plate can be used to form each of the first wall 170, the first flange 180, the second wall 172, and the second flange 182. Where a single plate is used, one or more inlets for air flow can be provided with apertures extending through the plate.

According to some embodiments, the smoking device 100 can define an upper inlet 150 on an upper side thereof. The upper inlet 150 can be formed between components of the first plate 110 and the second plate 112. The upper inlet 150 can provide fluid communication between an interior of the smoking device 100 and an air source (e.g., an external environment) to feed combustion within the smoking device 100. The upper inlet 150 can also provide access to an interior of the smoking device 100 (e.g., a combustion cavity 176) for loading a fuel into the smoking device 100.

According to some embodiments, the smoking device 100 can include one or more ignition ports 190 providing access to an interior (e.g., the combustion cavity 176) of the smoking device 100. The ignition port 190 can extend through the first plate 110, the second plate 112, the first end cap 130, and/or the second end cap 132. After loading a fuel into the smoking device 100, a user can use one or more of the ignition ports 190 to ignite a fuel within the smoking device 100. e.g., by bringing a heat source, open flame, spark or combination thereof into close enough proximity, outside the smoking device 100, to one or more ignition port 190 that fuel within the smoking device 100 ignites.

Figure 3:
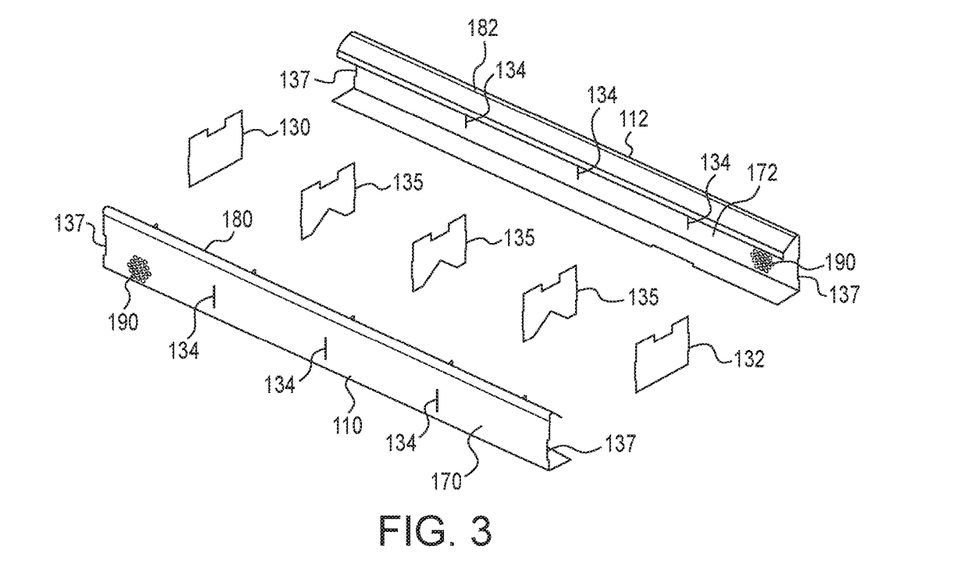
FIG. 3 shows a perspective exploded view of the smoking device of FIG. 2, according to some embodiments of the present disclosure.
Figure 4:
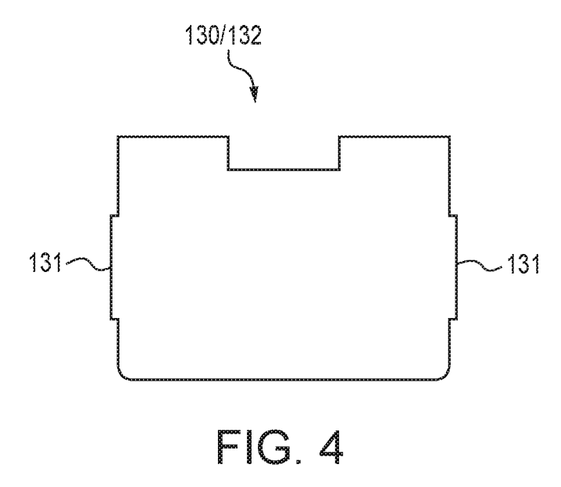
FIG. 4 shows a view of an end cap, according to some embodiments of the present disclosure.

According to some embodiments, for example as shown in FIGS. 3 and 4, the first plate 110 and the second plate 112 can each provide a receptacle 137 for receiving an extension 131 (see FIG. 4) of the first end cap 130 and/or the second end cap 132. The first end cap 130 and/or the second end cap 132 can be fixedly attached to one or both of the first plate 110 and the second plate 112 to hold the first plate 110 and the second plate 112 into a fixed arrangement. For example, the first end cap 130 and/or the second end cap 132 can be fixedly attached to one or both of the first plate 110 and the second plate 112 by interference fit, folding of an end cap around a plate or vice-versa, weld joint, integral manufacture, or a combination thereof. In some embodiments, the first end cap 130 and/or the second end cap 132 can be removably attached to the first plate 110 and the second plate 112.

According to some embodiments, for example as shown in FIG. 3, the smoking device can include one or more partitions 135 between a first longitudinal end 102 of the smoking device 100 and a second longitudinal end 104 of the smoking device 100. The one or more partitions 135 can at least partially separate the smoking device 100 into two or more zones along a longitudinal length thereof, as discussed further herein.

The first plate 110 and the second plate 112 can each provide a receptacle 134 for receiving an extension 136 (see FIG. 5) of a partition 135. The partitions 135 can be fixedly attached to one or both of the first plate 110 and the second plate 112 to hold the first plate 110 and the second plate 112 into a fixed arrangement. For example, the partitions 135 can be fixedly attached to one or both of the first plate 110 and the second plate 112 by interference fit, folding of a partition around a plate or vice-versa, weld joint, integral manufacture, or a combination thereof. In some embodiments, the partitions 135 can be removably attached to the first plate 110 and the second plate 112.

Figure 5:
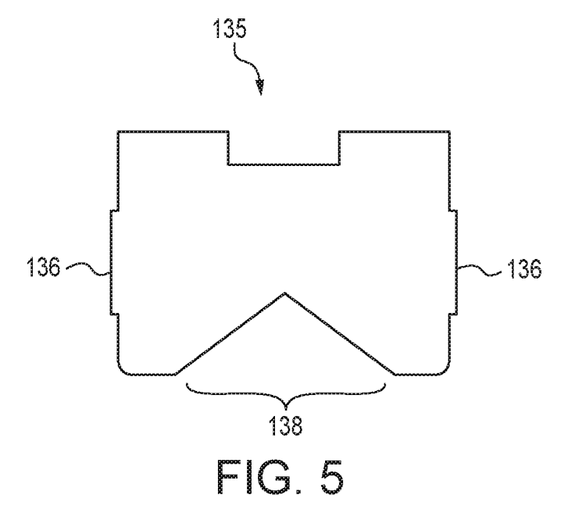
FIG. 5 shows a view of a partition, according to some embodiments of the present disclosure.

As shown in FIG. 5, each partition 135 can include a longitudinal opening 138 at a lower portion thereof to allow or facilitate communication and transmission of heat so that combustion on one side of a partition 135 can ignite a fuel on an opposite side of the partition 135. The longitudinal opening 138 can be provided at a lower portion of the partition 135 to initiate combustion at a lower portion of a fuel within the combustion cavity 176. Once a lower portion of a fuel is ignited, heat will move upward and combustion will propagate to an upper portion of the fuel. The longitudinal opening 138 be in the shape of a triangle, a rectangle, another polygon, a semi-circle, or another geometric or non-geometric shape.

Figure 6:
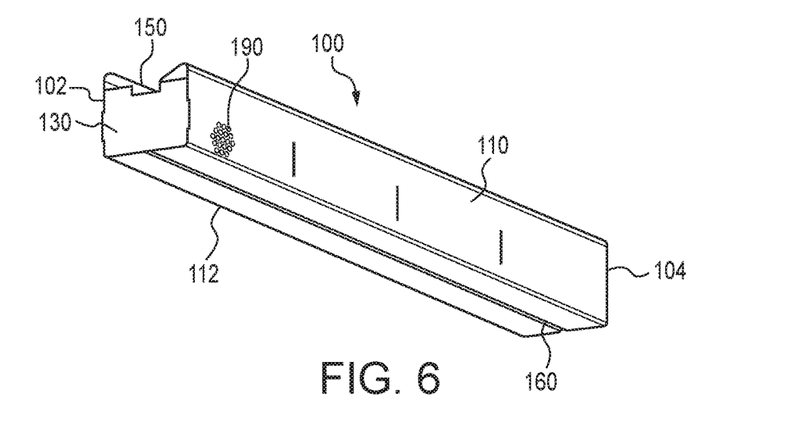
FIG. 6 shows a perspective view of the smoking device of FIG. 2, according to some embodiments of the present disclosure.

According to some embodiments, for example as shown in FIG. 6, the smoking device 100 can define a lower inlet 160 at a lower side thereof. The lower inlet 160 can be formed between components of the first plate 110 and the second plate 112, or through a bottom wall of the smoking device 100. The lower inlet 160 can provide fluid communication between an interior of the smoking device 100 and an air source (e.g., an external environment) to facilitate combustion within the smoking device 100. Alternatively, the lower inlet 160 can be omitted.

Figure 7A:
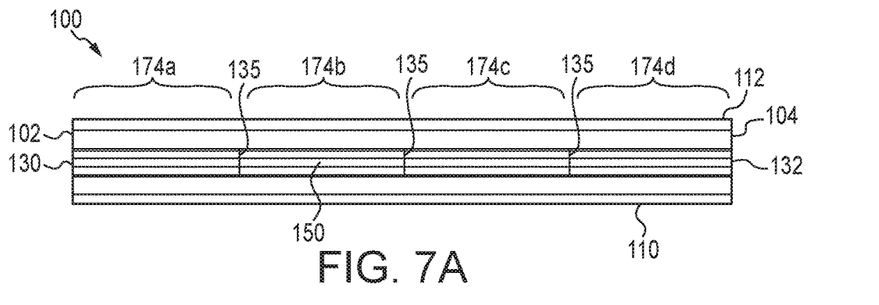
FIG. 7A shows a top view of the smoking device of FIG. 2, according to some embodiments of the present disclosure.
Figure 7B:
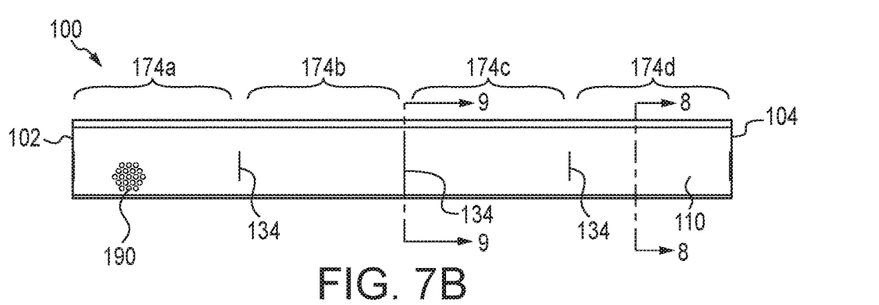
FIG. 7B shows a side view of the smoking device of FIG. 2, according to some embodiments of the present disclosure.
Figure 7C:
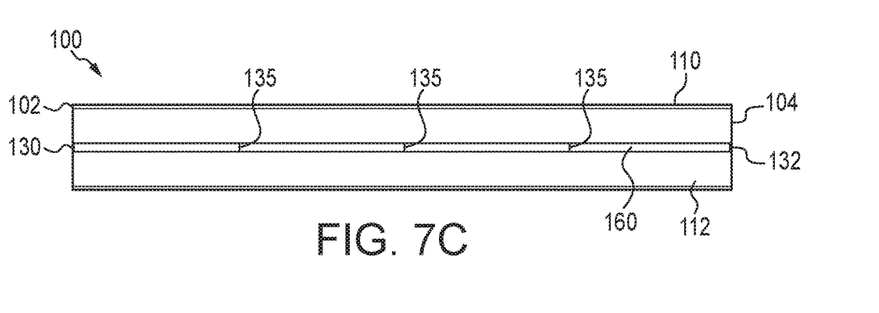
FIG. 7C shows a bottom view of the smoking device of FIG. 2, according to some embodiments of the present disclosure.

According to some embodiments, for example as shown in FIGS. 7A-7C, the first end cap 130, the second end cap 132, and the one or more partitions 135 can define a plurality of zones 174a, 174b, 174c, and 174d along a longitudinal length of the smoking device 100. The separation of the combustion cavity 176 of the smoking device 100 into separate zones 174 can assist a user's in or facilitate selecting approximately the duration of combustion time by loading fuel in a selected number of contiguous zones 174. Each zone can hold an amount of fuel that is to be combusted for a given amount of time. The zones 174 can be of equal or different size (e.g., length). A user can fill a number of zones 174 that correspond to the total amount of combustion time desired, although actual combustion time may differ. Contiguous zones 174 are loaded so that combustion from one zone leads to combustion of the next contiguous zone through the corresponding partition 135. The ignition port 190 can be provided at a longitudinally endmost one of the zones 174 so that combustion starts at one end of the smoking device 100 and continues longitudinally toward an opposite end of the smoking device 100. Alternatively or in combination, one or more ignition ports 190 can be provided at a zone 174 that is not a longitudinally endmost zone to promote combustion propagation in opposite longitudinal directions.

Figure 8:
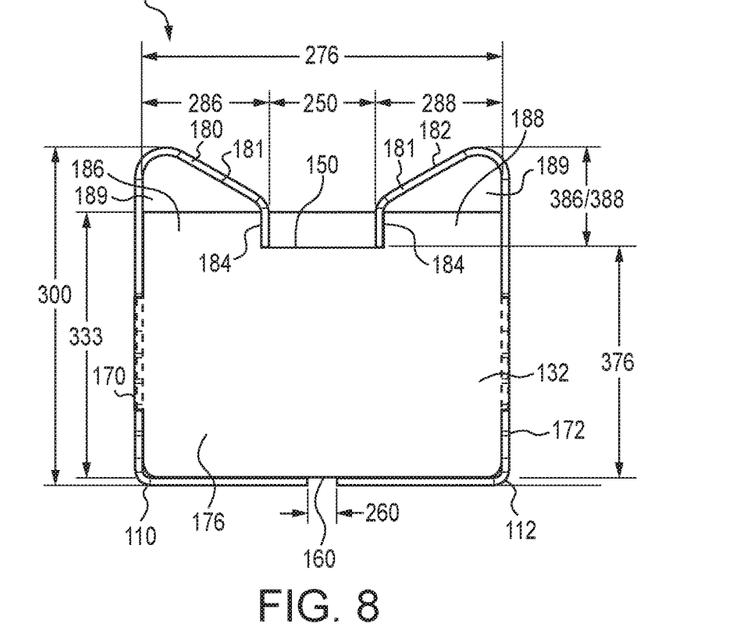
FIG. 8 shows a sectional view of the smoking device of FIG. 2, according to some embodiments of the present disclosure.

The combustion cavity 176 can house a fuel (not shown) that is loaded therein, for example, via the upper inlet 150. The first flange 180, extending from the first wall 170, can define, at least in part or entirely, a first recirculation channel 186 that is open to an upper side of the combustion cavity 176 and closed on a side thereof that is opposite the upper side of the combustion cavity 176, for example as illustrated in FIG. 8. The first wall 170 optionally can cooperate with the first flange 180 in defining the first recirculation channel 186. A transition from the first wall 170 to the first flange 180 can be located across the first recirculation channel 186 from a terminal end of the first flange 180. The second flange 182, extending above the second wall 172, can define, at least in part or entirely, a second recirculation channel 188 that is open to the upper side of the combustion cavity 176 and closed on a side thereof that is opposite the upper side of the combustion cavity 176, for example as illustrated in FIG. 8. The second wall 172 optionally can cooperate with the second flange 182 in defining the second recirculation channel 188. A transition from the second wall 172 to the second flange 182 can be located across the second recirculation channel 188 from a terminal end of the second flange 182. In embodiments wherein the first recirculation channel 186 and/or the second recirculation channel 188 has inner and/or outer lateral sides, one or both of the inner and outer lateral sides can be closed in some embodiments. For example, FIGS. 2 and 3 illustrate a smoking device 100 wherein each of the first recirculation channel 186 and/or the second recirculation channel 188 has inner and outer lateral sides, and the inner and outer sides are closed. As shown in FIG. 8, each of the first flange 180 and the second flange 182 can extend upwardly from the first wall 170 or the second wall 172, reach an uppermost peak (e.g., a farthest extent from the combustion cavity 176 and/or the lower inlet 160), extend inwardly toward the upper inlet 150, and/or extend downwardly toward the combustion cavity 176 and/or the lower inlet 160. Accordingly, the first recirculation channel 186 and the second recirculation channel 188 defined by the first flange 180 and the second flange 182 can provide a recirculation pathway from the first wall 170 or the second wall 172 to the upper inlet 150. Each of the first flange 180 and the second flange 182 can include one or more flat or planar sections. Each of the first flange 180 and the second flange 182 can include and/or terminate with a vertical section 184 that is oriented vertically. The vertical section 184 can extend toward, and optionally terminate at, the upper inlet 150. The vertical section 184 of the first flange 180 and the vertical section 184 of the second flange 182 can be planar and/or parallel to each other. For example, the vertical section 184 of the first flange 180 and the vertical section of the second flange 182 can define, at least in part or entirely, the upper inlet 150. The first flange 180 can include and/or terminate in a funnel section 181 that extends both downwardly (e.g., a bottom of the smoking device 100) and toward the second wall 172, and the second flange 182 can include and/or terminate in a funnel section 181 that extends both downwardly (e.g., a bottom of the smoking device 100) and toward the first wall 170. The funnel sections 181 can be planar and/or curved. During loading of a fuel, the funnel sections 181 can direct the fuel toward the upper inlet 150 and the combustion cavity 176. Each of the first flange 180 and the second flange 182 can include and/or terminate in a curved section. Each of the first flange 180 and the second flange 182 can be curved along its entire length.

The first recirculation channel 186 and the upper inlet 150 can be separated by the first flange 180. The second recirculation channel 188 and the upper inlet 150 can be separated by the second flange 182.

According to some embodiments, for example as shown in FIG. 8, the first plate 110 and the second plate 112 can include the first wall 170 and the second wall 172 that define, at least in part or entirely, the combustion cavity 176.

According to some embodiments, the combustion cavity 176 has a maximum combustion cavity width 276. e.g., between the first wall 170 and the second wall 172. The first recirculation channel 186 has a maximum first recirculation channel width 286. The second recirculation channel 188 has a maximum second recirculation channel width 288. The upper inlet 150 has a maximum upper inlet width 250. The maximum combustion cavity width 276 can be substantially equal to a maximum width of the entire smoking device 100. The maximum combustion cavity width 276 can be substantially equal to a sum of the maximum first recirculation channel width 286, the maximum second recirculation channel width 288, and the maximum upper inlet width 250. The maximum upper inlet width 250 can be 20-50% of the maximum combustion cavity width 276. The maximum first recirculation channel width 286 can be equal to the maximum second recirculation channel width 288. For example, the smoking device 100 can be bilaterally symmetric across an axis that extends through the upper inlet 150 and the lower inlet 160. The maximum lower inlet width 260 can be less than 20% of the maximum combustion cavity width 276. Alternatively, the lower inlet 160 can be omitted. The maximum first recirculation channel width 286, the maximum second recirculation channel width 288, and the maximum upper inlet width 250 can all be equal or within 10% of a single dimension.

According to some embodiments, the combustion cavity 176 has a maximum combustion cavity height 376. The first recirculation channel 186 has a maximum first recirculation channel height 386. The second recirculation channel 188 has a maximum second recirculation channel height 388. A maximum device height 300 can be substantially equal to a maximum height of the entire smoking device 100 or an interior thereof. The maximum first recirculation channel height 386 and/or the maximum second recirculation channel height 388 can be 25-50% of the maximum device height 300. As such, a maximum combustion cavity height 376 can be 1-3 times the maximum first recirculation channel height 386 and/or the maximum second recirculation channel height 388.

The first end cap 130, the second end cap 132, and/or one or more partitions 135 have a maximum partition height 333. The maximum device height 300 can be substantially equal to a sum of the maximum combustion cavity height 376 and one of the maximum first recirculation channel height 386 or the maximum second recirculation channel height 388. The maximum partition height 333 can be greater than the maximum combustion cavity height 376 and less than the maximum device height 300, such that the corresponding first end cap 130, the second end cap 132, and/or one or more partitions 135 extends partially into (e.g., above a lower end of) the first recirculation channel 186 and/or the second recirculation channel 188. A gap above first end cap 130, the second end cap 132, and/or one or more partitions 135, or an opening through an upper portion of one or more of them, may be maintained to provide a longitudinal passage 189 over or through the corresponding first end cap 130, the second end cap 132, and/or one or more partitions 135. Smoke generated within the combustion cavity 176 can collect and move within the first recirculation channel 186 and/or the second recirculation channel 188 and through the longitudinal passages. At the first longitudinal end 102 of the smoking device 100 and the second longitudinal end 104 of the smoking device 100, the smoke can move over the first end cap 130 and the second end cap 132, or through openings in their upper portions, to be released into the smoking chamber 50.

The terms "top" and "bottom" as used in this disclosure should be understood as referring to the ordinary gravitational frame of reference. As used herein, a height is a distance that is measured parallel to an axis that (i) is orthogonal to a longitudinal axis of the smoking device 100 and (ii) extends through top and bottom surfaces of the smoking device 100. The longitudinal axis of the smoking device 100 extends through the first longitudinal end 102, the second longitudinal end 104, and each of the zones 174. As used herein, a length is a distance that is measured parallel to a longitudinal axis of the smoking device 100. As used herein, a width is a distance that is measured parallel to an axis that (i) is orthogonal to a longitudinal axis of the smoking device 100 and (ii) extends through the first wall 170 and the second wall 172.

Figure 9:
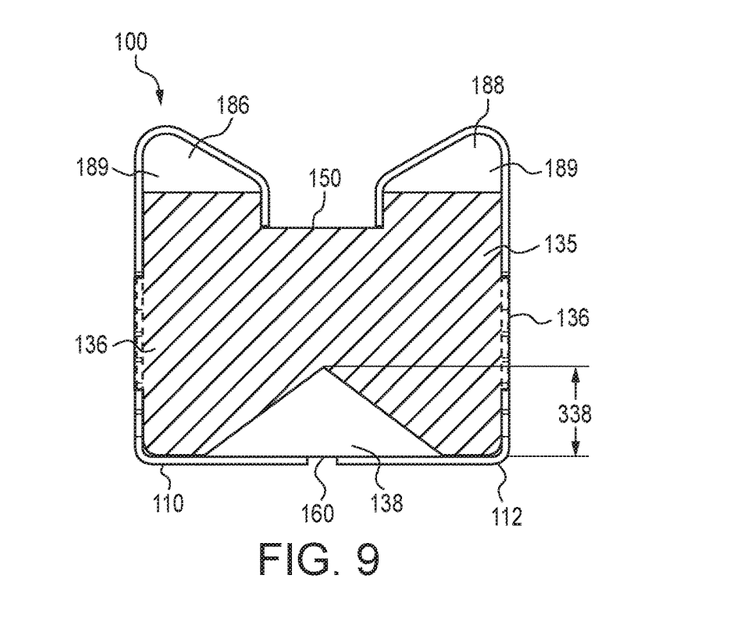
FIG. 9 shows a sectional view of the smoking device of FIG. 2, according to some embodiments of the present disclosure.

According to some embodiments, for example as shown in FIG. 9, the opening 138 of one or more partitions 135 is at a lower side of the combustion cavity 176. The opening 138 can be adjacent to the lower inlet 160. The opening 138 can have an opening height 338 that is 25-50% of the maximum device height 300.

According to some embodiments, each of the first wall 170, the second wall 172, the first flange 180, and the second flange 182 extends from a first longitudinal end 102 of the smoking device 100 to a second longitudinal end 104 of the smoking device 100. According to some embodiments, each of the combustion cavity 176, the first recirculation channel 186, the second recirculation channel 188, and the upper inlet 150 extends from a first longitudinal end 102 of the smoking device 100 to a second longitudinal end 104 of the smoking device 100.

According to some embodiments, during operation of the smoking device 100, wood chips, wood pellets, and/or another fuel are inserted through the upper inlet 150 into the combustion cavity 176. The combustion cavity 176 is filled below the level of the first flange 180 and/or the second flange 182. One or more of a plurality of zones 174a, 174b, 174c, and 174d can be filled. Each zone 174 can contain enough fuel for combustion for a given period of time (e.g., 2 hours). If only the given period of time is desired, then only one zone 174 is filled. If additional time is desired, then additional zones 174 can be filled. The actual combustion time may differ from the given time, which may be an estimated time for combustion of a fully-loaded zone. Each of the zones 174 that are filled can be contiguous, such that combustion in one zone 174 eventually leads to combustion in an adjacent zone 174. In some embodiments, at least one of the zones can be accessed via the ignition port 190.

Prior to ignition, the smoking device 100 is placed within the receptacle 30 of the cooking device 10, which contains food within its smoking chamber 50. A flame, a spark, and/or heat is provided at the ignition port 190 of the smoking device 100 until combustion of the fuel commences. The fuel will receive sufficient air through the lower inlet 160 to maintain combustion without a flame. Additional air can enter through the upper inlet 150. The combustion will propagate along the longitudinal length of the combustion cavity 176, providing smoke at a designated rate for a designated period of time that is dependent, at least in part, on the length of the one or more zones 174 that are loaded with the fuel.

Figure 10:
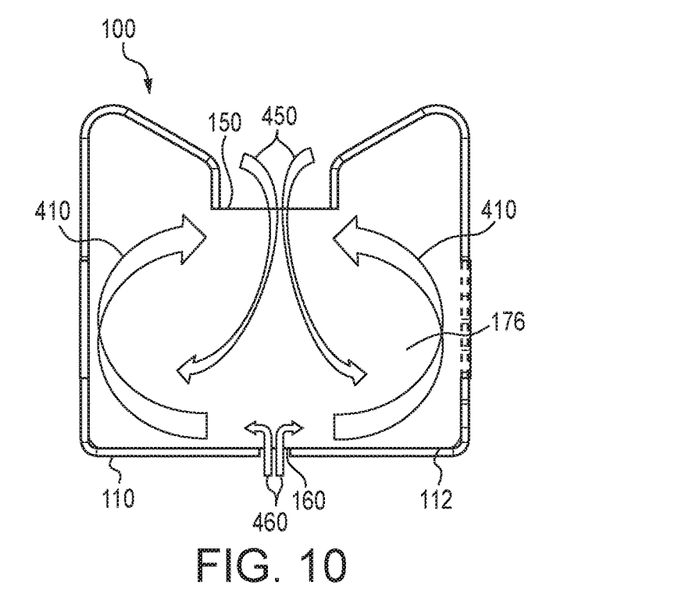
FIG. 10 shows a schematic view of flow within the smoking device of FIG. 2, according to some embodiments of the present disclosure.

According to some embodiments, slow combustion can occur to produce smoke with minimal or no flame present. FIG. 10 illustrates schematically an example of heat and air flow during slow combustion. A fuel (not shown) within the combustion cavity 176 is combusted while receiving a lower flow 460 of air through the lower inlet 160 and an upper flow 450 of air through the upper inlet 150. Heat flow 410 during the slow combustion stage is distributed and propagated throughout the combustion cavity 176. Heat flow 410 during the slow combustion stage is more gradual and evenly distributed than would be heat flow when a flame is present.

Figure 11:
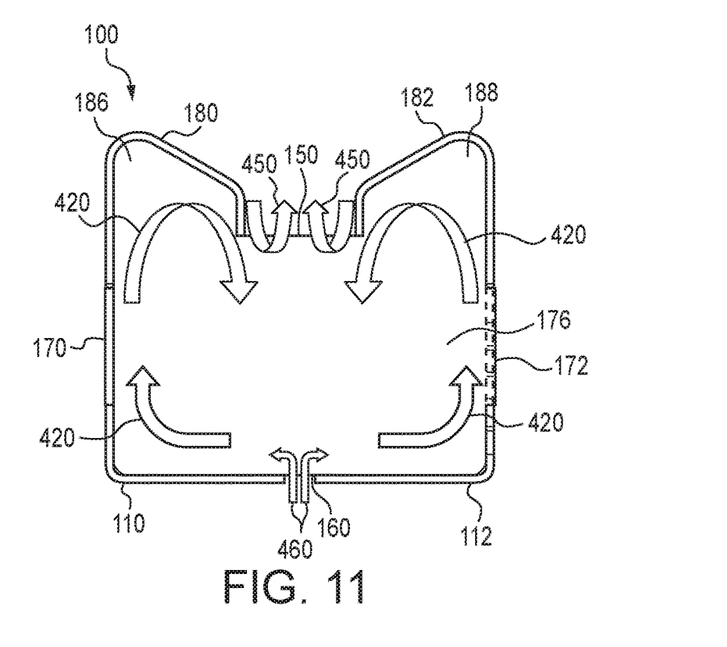
FIG. 11 shows a schematic view of flow within the smoking device of FIG. 2, according to some embodiments of the present disclosure.

According to some embodiments, a flame may occasionally and temporarily form during combustion of the fuel. FIG. 11 illustrates schematically an example of heat and air flow during combustion with a flame. While a flame is generated within the combustion cavity 176, a convection flow 420 is directed along the walls 170, 172 and within the combustion cavity 176. The convection flow 420 continues in the first recirculation channel 186 and the second recirculation channel 188. The walls 170, 172 and the flanges 180, 182 provide a smooth transition from the combustion cavity 176 to the first recirculation channel 186 and the second recirculation channel 188, respectively. The arrangement of the flanges 180, 182 direct the convection flow 420 (i) along the first flange 180 and within the first recirculation channel 186 toward the upper inlet 150 or (ii) along a second flange 182 and within the second recirculation channel 188 toward the upper inlet 150. As the convection flow 420 from the first recirculation channel 186 and the second recirculation channel 188 reaches, and in some embodiments converges at, the upper inlet 150, the upper flow 450 of air through the upper inlet 150 is reduced. The presence of the convection flow 420 produces a high pressure condition at the upper inlet 150 that reduces intake of the upper flow 450 of air. Due to the extent of combustion, the convection flow 420 lacks enough oxygen to sustain a flame without the upper flow 450 of air from the upper inlet 150. Due to the reduction of air from the upper inlet 150, the flame propagating from the fuel is reduced and eventually extinguished, and combustion is slowed. In the absence of a flame, the heat and air flow return to the patterns illustrated in FIG. 10. In some embodiments, the periods of time in which a flame exists can be limited to 20 seconds or less.

The smoking process can be maintained across a duration of time that is determined according to the size and number of zones 174 that are loaded with a fuel. As the fuel in a given zone 174 is combusted, combustion activity continues in the remaining fuel until all of the remaining fuel is located at a lower portion of the combustion cavity 176, near the lower inlet 160. When the combustion activity reaches an opening 138 of a partition 135, the combustion activity can extend through the opening 138 from one zone 174 to an adjacent zone 174. Accordingly, the combustion activity can propagate longitudinally through the partitions 135 through the plurality of zones 174 that are loaded with a fuel. The combustion activity can propagate until all of the fuel in each of the zones 174 has been combusted. The duration of time for complete combustion of all fuel is based on the amount of fuel provided in the selected number of zones 174.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the subject technology have been described, these have been presented by way of example only, and are not intended to limit the scope of the subject technology. Indeed, the novel methods and systems described herein may be embodied in a variety of other forms without departing from the spirit thereof. The accompanying claims and their equivalents are intended to cover such forms or modifications as would fall within the scope and spirit of the subject technology.

What is claimed is:

1. A smoking device, comprising:
   one or more plates defining, at least in part, a combustion cavity,
   wherein a first plate includes a first wall and a first flange extending from the first wall, and a second plate includes a second wall and a second flange extending from the second wall;
   a lower inlet connecting the combustion cavity to an air source;
   the first flange defining, at least in part, a first recirculation channel open to an upper side of the combustion cavity;
   the second flange defining, at least in part, a second recirculation channel open to the upper side of the combustion cavity; and
   an upper inlet connecting the upper side of the combustion cavity to the air source and disposed between the first recirculation channel and the second recirculation channel, wherein the upper inlet is defined by a space between the first flange and the second flange.

2. The smoking device of claim 1, wherein the combustion cavity has a maximum combustion cavity width that is substantially equal to a sum of a maximum first recirculation channel width of the first recirculation channel, a maximum second recirculation channel width of the second recirculation channel, and a maximum upper inlet width of the upper inlet.

3. The smoking device of claim 2, wherein the maximum upper inlet width is 20-50% of the maximum combustion cavity width.

4. The smoking device of claim 2, wherein the maximum first recirculation channel width is equal to the maximum second recirculation channel width.

5. The smoking device of claim 2, wherein a maximum lower inlet width is 10-20% of the maximum combustion cavity width.

6. The smoking device of claim 1, wherein a maximum combustion cavity height of the combustion cavity is 1-3 times a maximum first recirculation channel height of the first recirculation channel.

7. The smoking device of claim 1, wherein a maximum combustion cavity height of the combustion cavity is 1-3 times a maximum recirculation channel height of each of the first recirculation channel and the second recirculation channel.

8. The smoking device of claim 1, wherein the upper inlet and the lower inlet are on opposite sides of the combustion cavity.

9. The smoking device of claim 1, wherein the first recirculation channel and the upper inlet are separated by the first flange.

10. The smoking device of claim 1, wherein the second recirculation channel and the upper inlet are separated by the second flange.

11. The smoking device of claim 1, wherein each of the one or more walls, the first flange, and the second flange extends from a first longitudinal end of the smoking device to a second longitudinal end of the smoking device.

12. The smoking device of claim 1, wherein each of the combustion cavity, the first recirculation channel, and the second recirculation channel, and the upper inlet extends from a first longitudinal end of the smoking device to a second longitudinal end of the smoking device.

13. The smoking device of claim 1, further comprising a first end cap at a first longitudinal end of the smoking device and a second end cap at a second longitudinal end of the smoking device.

14. The smoking device of claim 1, further comprising one or more partitions between a first longitudinal end of the smoking device and a second longitudinal end of the smoking device, the one or more partitions partially separating the combustion cavity into two or more zones.

15. The smoking device of claim 14, wherein each of the one or more partitions provides a longitudinal opening through the corresponding partition and adjacent to the lower inlet.

16. The smoking device of claim 14, further comprising an ignition port at a longitudinal endmost zone of the two or more zones.

* * * * *